(12) United States Patent
Wang et al.

(10) Patent No.: US 7,852,760 B2
(45) Date of Patent: Dec. 14, 2010

(54) HETEROGENEOUS NETWORK PACKET DISPATCH METHODOLOGY

(75) Inventors: Yuh-Ching Wang, Yunlin County (TW); Yu-Hsien Chiu, Kaohsiung County (TW); Po-Chia Chu, Kaohsiung (TW); Tsung-Ying Yang, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 605 days.

(21) Appl. No.: 11/785,515

(22) Filed: Apr. 18, 2007

(65) Prior Publication Data

US 2008/0112420 A1 May 15, 2008

(30) Foreign Application Priority Data

Nov. 15, 2006 (TW) ............... 95142281 A

(51) Int. Cl.
*H04J 3/00* (2006.01)
(52) U.S. Cl. ............ 370/230; 370/229; 370/230.1
(58) Field of Classification Search .......... 370/229–241
See application file for complete search history.

(56) References Cited

U.S. PATENT DOCUMENTS

| 5,452,291 | A | * | 9/1995 | Eisenhandler et al. ....... 370/402 |
| 5,666,364 | A | | 9/1997 | Pierce et al. |
| 5,694,545 | A | * | 12/1997 | Roskowski et al. ......... 709/231 |
| 5,768,257 | A | * | 6/1998 | Khacherian et al. ......... 370/229 |
| 5,904,732 | A | * | 5/1999 | Greenley et al. ............ 710/57 |
| 5,991,302 | A | | 11/1999 | Berl et al. |
| 6,122,252 | A | * | 9/2000 | Aimoto et al. ............. 370/235 |
| 6,760,303 | B1 | * | 7/2004 | Brouwer .................... 370/229 |
| 6,791,979 | B1 | | 9/2004 | Berl et al. |
| 6,879,561 | B1 | * | 4/2005 | Zhang et al. ................ 370/235 |
| 6,947,437 | B1 | * | 9/2005 | Erimli et al. ................ 370/418 |
| 2002/0018475 | A1 | * | 2/2002 | Ofek et al. .................. 370/400 |
| 2002/0165957 | A1 | * | 11/2002 | Devoe et al. ................ 709/224 |
| 2003/0067929 | A1 | * | 4/2003 | Matsuzawa ................ 370/401 |
| 2003/0135719 | A1 | * | 7/2003 | DeWitt et al. .............. 712/227 |
| 2005/0185651 | A1 | * | 8/2005 | Rinne ..................... 370/395.1 |
| 2006/0159047 | A1 | | 7/2006 | Olvera-Hernandez et al. |

FOREIGN PATENT DOCUMENTS

| CA | 2666198 A1 | 2/2004 |
| CA | 2669483 A1 | 4/2004 |
| TW | 324870 | 1/1998 |
| TW | 453069 | 9/2001 |
| TW | 478265 | 3/2002 |
| TW | 542960 | 7/2003 |
| TW | 579634 B | 3/2004 |
| TW | 595169 | 6/2004 |

(Continued)

*Primary Examiner*—William Trost, IV
*Assistant Examiner*—Ashil Farahmand
(74) *Attorney, Agent, or Firm*—Birch, Stewart, Kolasch & Birch, LLP

(57) ABSTRACT

The present invention relates to a method and a device for dispatching packets with different network protocols and supporting IP-based networks, Non-IP-based networks, controller networks and multimedia networks. With the method and the device of the present invention, the network user can easily add new network services to the existing network structure. Meanwhile, dispatch of network packets is more efficient.

8 Claims, 11 Drawing Sheets

FOREIGN PATENT DOCUMENTS

| | | |
|---|---|---|
| TW | I227080 | 1/2005 |
| TW | 200522615 | 7/2005 |
| TW | 242343 B | 10/2005 |
| TW | 200536310 | 11/2005 |
| TW | 247506 B | 1/2006 |
| TW | 257788 B | 7/2006 |
| TW | 295396 Y | 8/2006 |

* cited by examiner

| Packet Pattern | Packet Source Address | Packet Destination Address | Prioring Sub-Buffer NO. |
|---|---|---|---|
| Cj | $x_1 x_2 \ldots x_m - y_1 y_2 \ldots y_n$ | $x_1 x_2 \ldots x_m - y_1 y_2 \ldots y_n$ | 1 |
| Ej | $x_1 x_2 \ldots x_m - y_1 y_2 \ldots y_n$ | $x_1 x_2 \ldots x_m - y_1 y_2 \ldots y_n$ | 2 |
| Sk | $x_1 x_2 \ldots x_m - y_1 y_2 \ldots y_n$ | $x_1 x_2 \ldots x_m - y_1 y_2 \ldots y_n$ | ⋮ |
| Dm | $x_1 x_2 \ldots x_m - y_1 y_2 \ldots y_n$ | $x_1 x_2 \ldots x_m - y_1 y_2 \ldots y_n$ | N |

FIG. 8A

| Sub-Buffer No. | Destination Network | Packet Pattern | Sub-buffer Priority |
|---|---|---|---|
| 1 | A | Ci | 2 |
| 2 | A | Sk | 3 |
| 3 | B | Ej | 1 |
| 4 | B | Ci | 4 |
| 5 | C | Dm | 6 |
| 6 | C | Ci | 5 |

FIG. 9A

HETEROGENEOUS NETWORK PACKET DISPATCH METHODOLOGY

BACKGROUND OF THE INVENTION

1. Field of the Invention

The present invention relates to a heterogeneous packet dispatch method and device 2. Description of the Prior Art In recent years, the network system has become popular with more and more connection capability. Most electronic appliances are equipped with network connectivity. People desire to have their electronic appliances connected through the network system at home or in the car. Therefore, it is important to efficiently interconnect various electronic appliances.

New network-accessible devices are produced every day with problems of how to communicate these devices. There are different techniques and standards for interconnecting these devices such as wireless networks and wired networks. Wired networks include Ethernet networks, power line communication (PLC) networks and asymmetrical digital subscriber line (ADSL) networks. Wireless networks include 802.11a/b/g-based networks and WiMax networks. All the above-mentioned are IP-based networks and it is not problematic to communicate these IP-based networks.

However, the current portable devices employ universal serial bus (USB) and IEEE-1394 protocols; the car-use devices communicate through controller area network (CAN), local interconnect network (LIN) and media oriented systems transport (MOST) networks; and the home-use devices use X-10 or zigbee controller networks. All the above-mentioned are non-IP-based networks.

Accordingly, the present invention discloses a method and a device for dispatching packets with different network protocols and supporting IP-based networks, Non-IP-based networks, controller networks and multimedia networks. With the method and the device of the present invention, the network user can easily add new network services to the existing network structure. Meanwhile, dispatch of network packets is more efficient.

As mentioned, in a conventional network environment, the home-use network is based on Ethernet networks or wireless 802.11a/b/g-based networks. However, the remote controllers of household appliances use X-10 or zigbee controller networks and most portable devices such as mp3 players, digital cameras and digital video cameras use USB or IEEE-1394 protocols. Presently, the above-mentioned networks operate independently without communicating each other. The general gateway supports IP-based networks only and integrates the USB and IEEE-1394 protocols in the applications of the gateway. For car-use networks, CAN and LIN are used as applications of controller networks. Car-use multimedia networks use MOST and IDB-1394 protocols. These protocols are not compatible and, thus the users have to make efforts to find solutions according to practical requirement. Moreover, it is crucial to efficiently dispatch and manage network packets when devices are based on heterogeneous networks interconnect. Therefore, the present invention provides a mechanism for interconnecting these networks and efficiently controlling the dispatch of the dispatch of network packets so as to provide the users with user-friendly solutions.

Conventional network connection devices include at least a router, a bridge and a gateway. The conventional router is hardware and software for interconnecting different networks on the network layer. Therefore, the router comprises a plurality of transmission paths, each path having respective transmission speed and transmission time. The router receives a packet transmitted on the network, checks the destination address code in the information in the packet, and transmits the packet to a destination according to a best transmission path determined based on the size and priority of the packet. If the destination address code is unavailable or the transmission path is not determined, the packet will be abandoned by the router and an error message will be issued. In some cases, the number of transmission nodes for a packet is recorded and accumulated until the number reaches a limit. Then, the packet will be abandoned by the router and an error message will be issued. The conventional router only interconnects two different networks.

The conventional bridge interconnects two network devices with the same protocol and thus is a "bridge" between the two networks so as to determine whether the data frame is transmitted from one network to the other by way of the bridge. After the bridge receives a frame transmitted afar from the other end, the bridge compares the destination address of the frame with a look-up table in the bridge so as to determine whether the packet is transmitted from the same network if the destination address fits in with the look-up table. If the receiving end receives data on the same network, no bridge is required; otherwise, the bridge transmits the frame to the network where the destination device is on. The conventional bridge only provides interconnection between two network devices with the same protocol.

The conventional gateway typically includes hardware and software. It interconnects two networks with different protocols. Some gateways, such as application gateways, interpret the protocols in addition to transmitting data from one network to the other, while some gateways only transmit data and do not interpret the protocols. In other words, gateways can be either intelligent and able to identify and interpret the protocols or simply gateways for transmitting data to a destination address already known.

The conventional gateway includes telecommunication gateways and home gateways. A telecommunication gateway is generally installed in the control room of a telecommunication company so as to convert signals and phone calls and is not publicly seen. The local phone call is based on the public switched telephone network (PSTN), the cell phone call is based on the global system for mobile communication (GSM)/general packet radio service (GPRS), and Skype is based on voice-over-IP (VoIP) network. There are different gateways for various interconnections between the networks. The home gateway is a pass for communicating a household and an external network, a firewall, and a router for interconnecting at least two computer devices inside the household. In other words, the home gateway is a bridge for domestic and foreign control and communicating the domestic peripherals. Some home gateways also provide voice transmission. A typical home gateway provides IP-based functions such as IP sharing, dynamic host configuration protocol (DHCP), network address translation (NAT), etc. The conventional gateway supports protocol transfer and routing only on IP-based networks and telecommunication circuits.

Accordingly, the present invention provides a multiplex management mechanism as well as a packet dispatch mechanism. Some prior art references disclose these two mechanisms. For multiplex management, Taiwan Patent No. 324870 "Network Switch" and Taiwan Patent No. 453069 "Packet Dispatch Method with Parallel Multiplex" are only applicable to a single network with multiple nodes. However, the present invention is applicable to heterogeneous networks and the design of buffers is different from that in the prior art references.

For packet dispatch, Taiwan Patent No. 542960 "Scheduling Method and Device of Packet Switching Network", Taiwan Patent No. 595169 "Packet Dispatch Device, Scheduler, Data Dispatch Device and Packet Dispatch Method", Taiwan Patent Pub. No. 200522615 "Scheduling Packet Dispatch", Taiwan Patent Pub. No. 200536310 "Packet Scheduling for Multimedia Stream according to Priority and Buffer States", Taiwan Patent No. 1227080 "Network Switch and Method with Traffic Control" and Taiwan Patent No. 478265 "Generating Method and Device for Traffic Control Signal" are only applicable to a single telecommunication network.

In U.S. Pat. No. 5,991,302, a transmission priority (TP) layer with priority setting is added to the packet protocols so as to classify the connection into four levels—low, normal, medium and high. In U.S. Pat. No. 6,791,979, the packets are classified using a packet filter so as to provide the packets with suitable TP values. In U.S. Pat. No. 5,666,364, a self-defined protocol is used to register the services from different networks and determine the priority.

SUMMARY OF THE INVENTION

It is a object of the present invention to provide a method and a device for dispatching packets with different network protocols.

In order to achieve the foregoing object, the present invention provides a packet dispatch method, using: a packet dispatch device connected to at least three heterogeneous networks, each network being connected to at least one of the other two heterogeneous networks, wherein the packet dispatch device receives a packet from one of the heterogeneous networks and delivers the packet to the other heterogeneous networks; a plurality of multiplex dispatch units for controlling accessing and full-load interruption of a receiver buffer and a transmitter buffer of the heterogeneous networks; and a dispatch unit for controlling packet path dispatch and priority schedule.

The present invention further provides a packet dispatch device for interconnection between a plurality of heterogeneous networks, the packet dispatch device comprising: at least three ports, each port being connected to at least one of the other two heterogeneous networks so as to receive a packet from one of the heterogeneous networks and transmit the packet to the other heterogeneous networks; a multiplex dispatch unit, for controlling accessing and full-load interruption of a receiver buffer and a transmitter buffer of the heterogeneous networks; and a dispatch unit for controlling packet path dispatch and priority schedule.

BRIEF DESCRIPTION OF THE DRAWINGS

The objects, spirits and advantages of the preferred embodiments of the present invention will be readily understood by the accompanying drawings and detailed descriptions, wherein:

FIG. 8A is a table showing the packet path and the classification according to the present invention;

FIG. 9A is a table showing the sub-buffer priority according to the present invention;

DETAILED DESCRIPTION OF THE PREFERRED EMBODIMENT

The present invention can be exemplified by the preferred embodiment as described hereinafter.

In the present invention, a packet dispatch device is disclosed. According to the present invention, the packet dispatch device comprises a plurality of units so as to achieve the function of the packet dispatch device.

Figure 1:
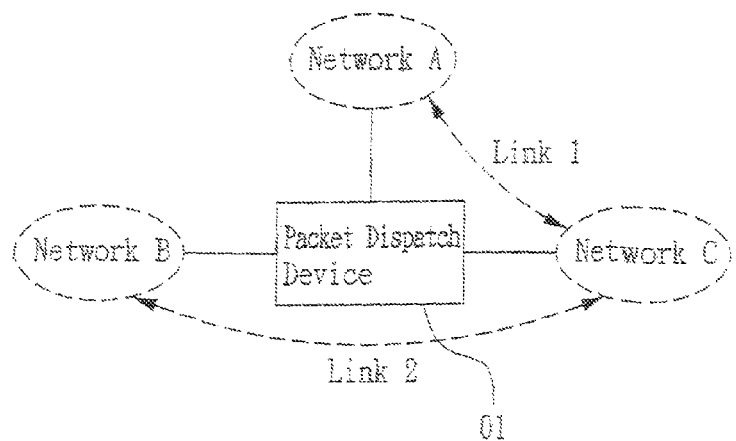
FIG. 1 is a schematic diagram showing a heterogeneous network communication system.

Please refer to FIG. 1, which is a schematic diagram showing a heterogeneous network communication system. In FIG. 1, the heterogeneous network communication system comprises a packet dispatch device and at least three heterogeneous networks A, B and C. Any two of the networks communicate via the packet dispatch device. Therefore, the heterogeneous network communication system comprises one or more links. The heterogeneous network communication system supports a network comprising the layer-2 network, the layer-3 network and the layer-4 network. The heterogeneous network communication system supports IP-based networks and non-IP-based networks. In one embodiment, the heterogeneous network communication system interconnects a CAN network, a USB network and a 1394 network. Link 1 indicates the transmission of sound information from an MP3 player on the USB network to the CAN network, while Link 2 indicates the transmission of sensor information from a sensor on the CAN network to a display on the 1394 network. In another embodiment, the heterogeneous network communication system interconnects an Ethernet network, an X-10 network and a zigbee network. The Ethernet network is IP-based. The X-10 network and the zigbee network are non-IP-based.

Figure 2:
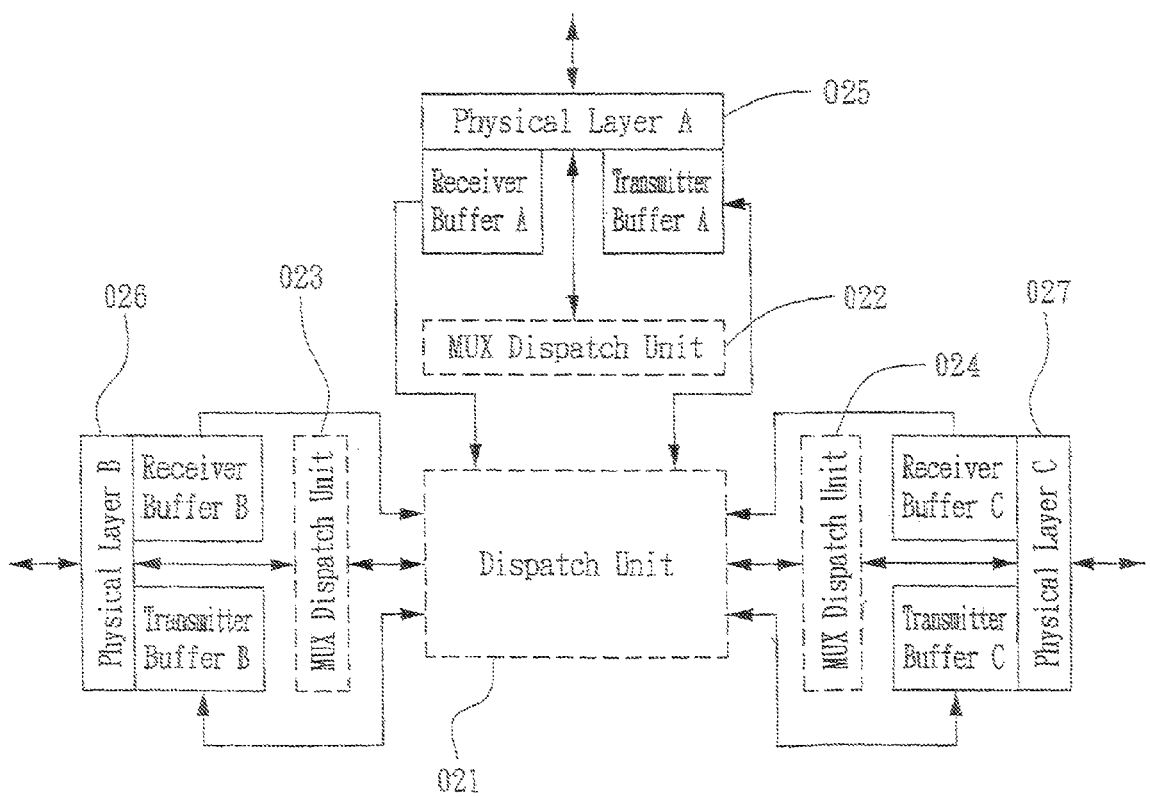
FIG. 2 is a schematic diagram showing a packet dispatch device according to the present invention.
Figure 3:
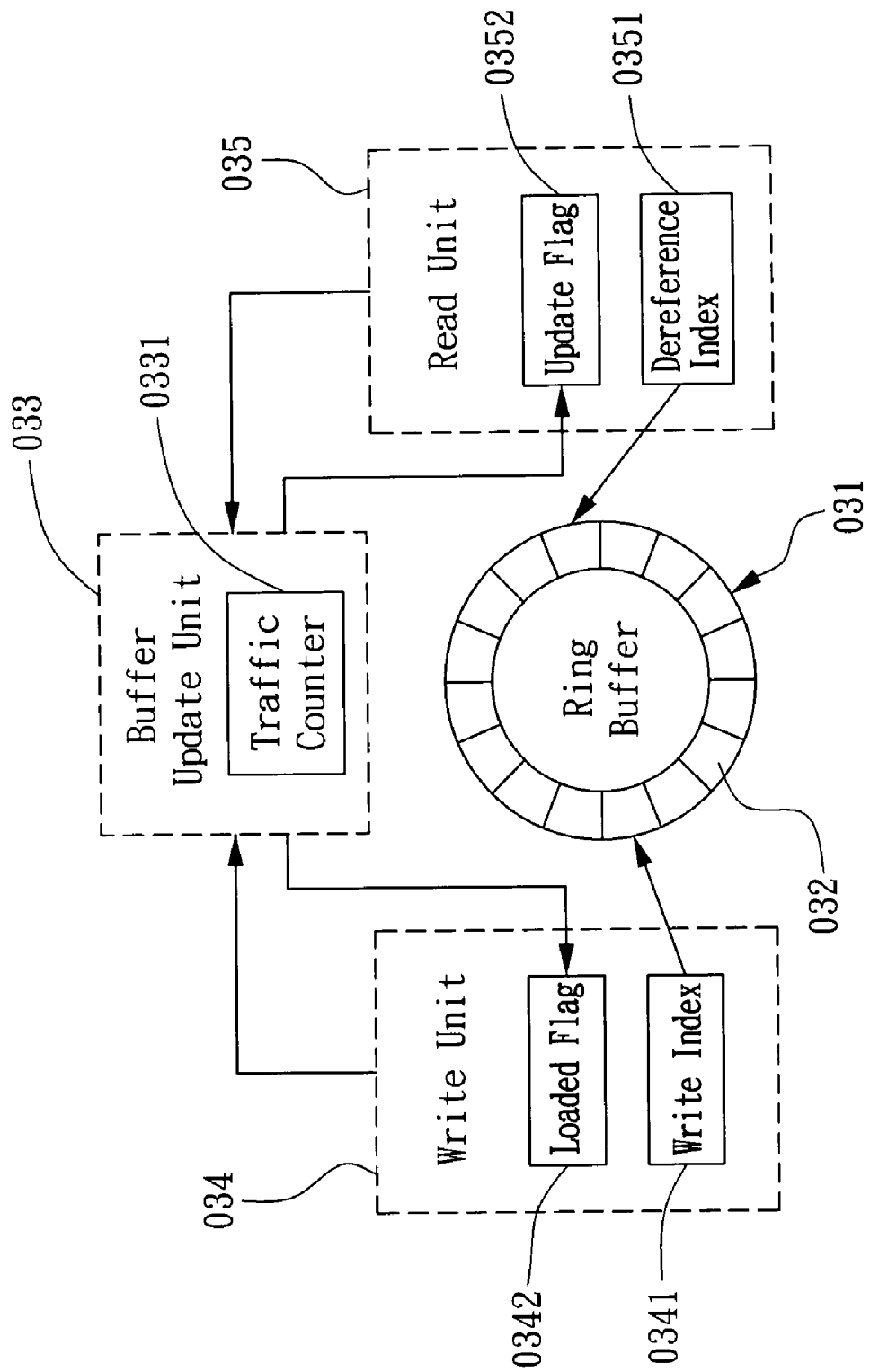
FIG. 3 is a schematic diagram showing a ring buffer according to the present invention.

Please also refer to FIG. 2, which is a schematic diagram showing a packet dispatch device according to the present invention. In FIG. 2, the packet dispatch device comprises a dispatch unit 021, a plurality of multiplex dispatch units 022, 023, 024, and at least three ports (physical layers) 025, 026 and 027, each port being connected to respective networks. Each port (physical layer) is provided with a transmitter buffer and a receiver buffer. The physical layer writes the received packet data into the receiver buffer and transmits the data in the transmitter buffer into the network. The multiplex dispatch units 022, 023, 024 are disposed between the dispatch unit 021 and the ports (physical layers) 025, 026 and 027, respectively, so as to control the accessing and traffic between the buffers. The transmitter buffer and the receiver buffer can be implemented using ring buffers. A ring buffer 031 (as shown in FIG. 3) comprises a storage array 032, a buffer update unit 033, a write unit 034 and a read unit 035. The storage array 032 uses a simple data structure as a buffer.

Two index (write index 0341 and dereference index 0351) are used to indicate the head and the tail of the ring so as to convert the in-line memory into a ring. A traffic counter 0331 is used to indicate the amount of data in the buffer. The write index 0341 is controlled by the write unit 034, while the dereference index 0351 is controlled by the read unit 035. When there is data to be written, the write unit 034 adds 1 to the write index 0341 and informs the buffer update unit 033 to add 1 to the traffic counter 0331. Meanwhile, the buffer update unit 033 issues an interrupt signal to the read unit 035 or activates an update flag 0352. The buffer update unit activates a loaded flag 0342 to inform the write unit 034 when the buffer is loaded with data. The read unit 035 adds 1 to the dereference index 0351 and informs the buffer update unit 033 to subtract 1 from the traffic counter 0331 when the data is read. When the write index 0341 or the dereference index 0351 has finished operation on the last section of the buffer, the operation proceeds with the first section of the buffer, which is referred to as a ring buffer.

Figure 4:
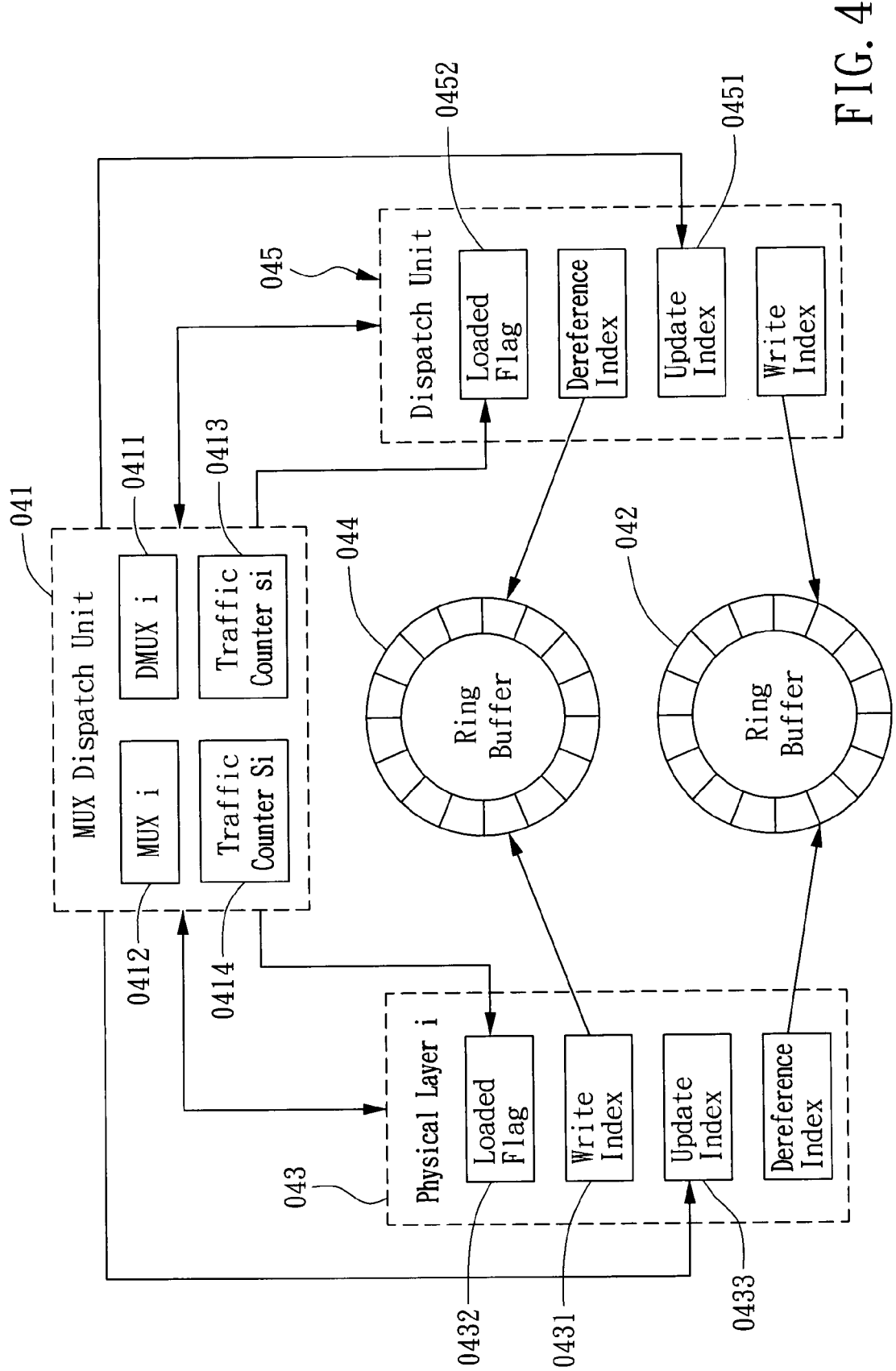
FIG. 4 is a schematic diagram showing a multiplex dispatch unit according to the present invention.
Figure 5:
FIG. 5 shows a packet.
Figure 6:
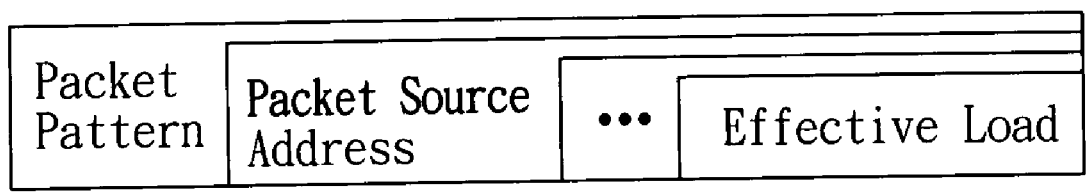
FIG. 6 shows a packet that is processed and re-packed by a multiplex dispatch unit according to the present invention.

Please refer to FIG. 4, which is a schematic diagram showing a multiplex dispatch unit according to the present invention. In FIG. 4, the multiplex dispatch unit 041 controls accessing and interruption of a receiver buffer and a transmitter buffer of the heterogeneous networks. For each network i, there are a demultiplexer i 0411 and a multiplexer i 0412. The demultiplexer 0411 analyzes the packet format (as shown in FIG. 5, wherein the packet is divided into a packet header and an effective load) and extracts information from the packet header such as the packet pattern, the packet source address and the packet destination address so as to re-pack the packet in a common packet format, as shown in FIG. 6. The multiplexer 0412 packs the data into specific formats and write the packed data into the transmitter buffer 0412. The accessing of the demultiplexers 0411 and multiplexers 0412 is scheduled by the multiplex dispatch unit 041. In one embodiment, the data re-packed by the multiplexer 0412 includes the packet source address and the packet pattern. In another embodiment, the data extracted by the demultiplexer 0411 includes the packet source address, the packet pattern and the time indication value. The time indication value of the packet is the time indication value of a 1394 synchronous packet. The time indication value is null for those packets that do not support synchronous transmission.

Please return to FIG. 4 for the multiplex dispatch unit 041. In FIG. 4, when the physical layer i043 (the physical layer of network i) receives a packet from the network i, the demultiplexer i 0411 in the multiplex dispatch unit 041 writes in the receiver buffer 044 according to the write index 0431 and informs the multiplex dispatch unit 041. The multiplex dispatch unit 041 issues an interrupt signal or activates an update index 0451 so as to inform the dispatch unit 045 that the receiver buffer 044 receives new data. Meanwhile, the multiplex dispatch unit 041 checks the value of the traffic counter Ri 0413. If the value of the traffic counter Ri 0413 is larger than the pre-determined threshold value, the loaded flag 0432 of the physical layer i 043 will be activated so as to inform the physical layer i 043 that the receiver buffer 044 is fully loaded. When the dispatch unit 045 is to transmit data to the network i, the multiplexer i 0412 in the multiplex dispatch unit 041 packs the data in a packet format so as to write in the transmitter buffer 042 and informs the multiplex dispatch unit 041. The multiplex dispatch unit 041 issues an interrupt signal or activates an update index 0433 so as to inform the physical layer i 043 that the transmitter buffer 42 receives new data. Meanwhile, the multiplex dispatch unit 041 checks the value of the traffic counter Si 0414. If the value of the traffic counter Si 0414 is larger than the pre-determined threshold value, the loaded flag 0452 of the dispatch unit 045 will be activated so as to inform the dispatch unit 045 that the transmitter buffer 042 is fully loaded.

Figure 7:
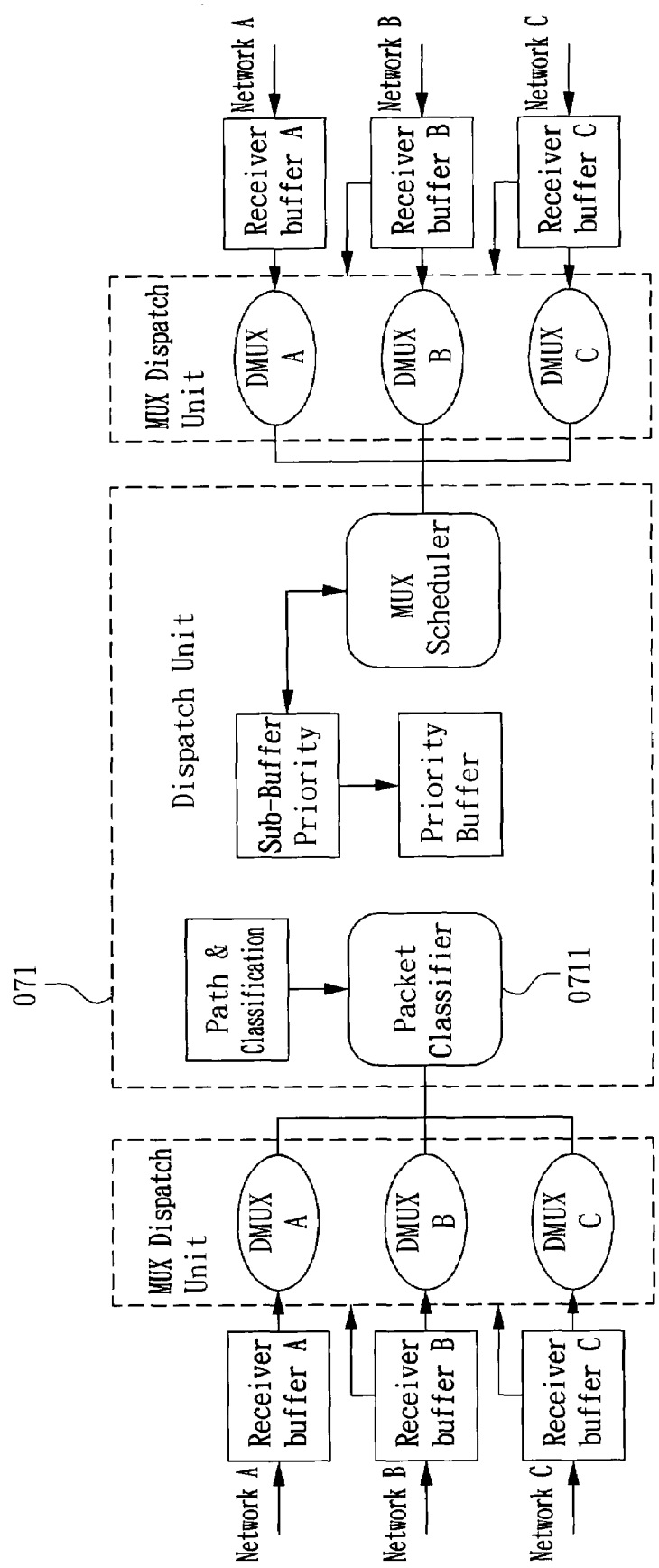
FIG. 7 is a schematic diagram showing a dispatch unit according to the present invention.
Figure 8:
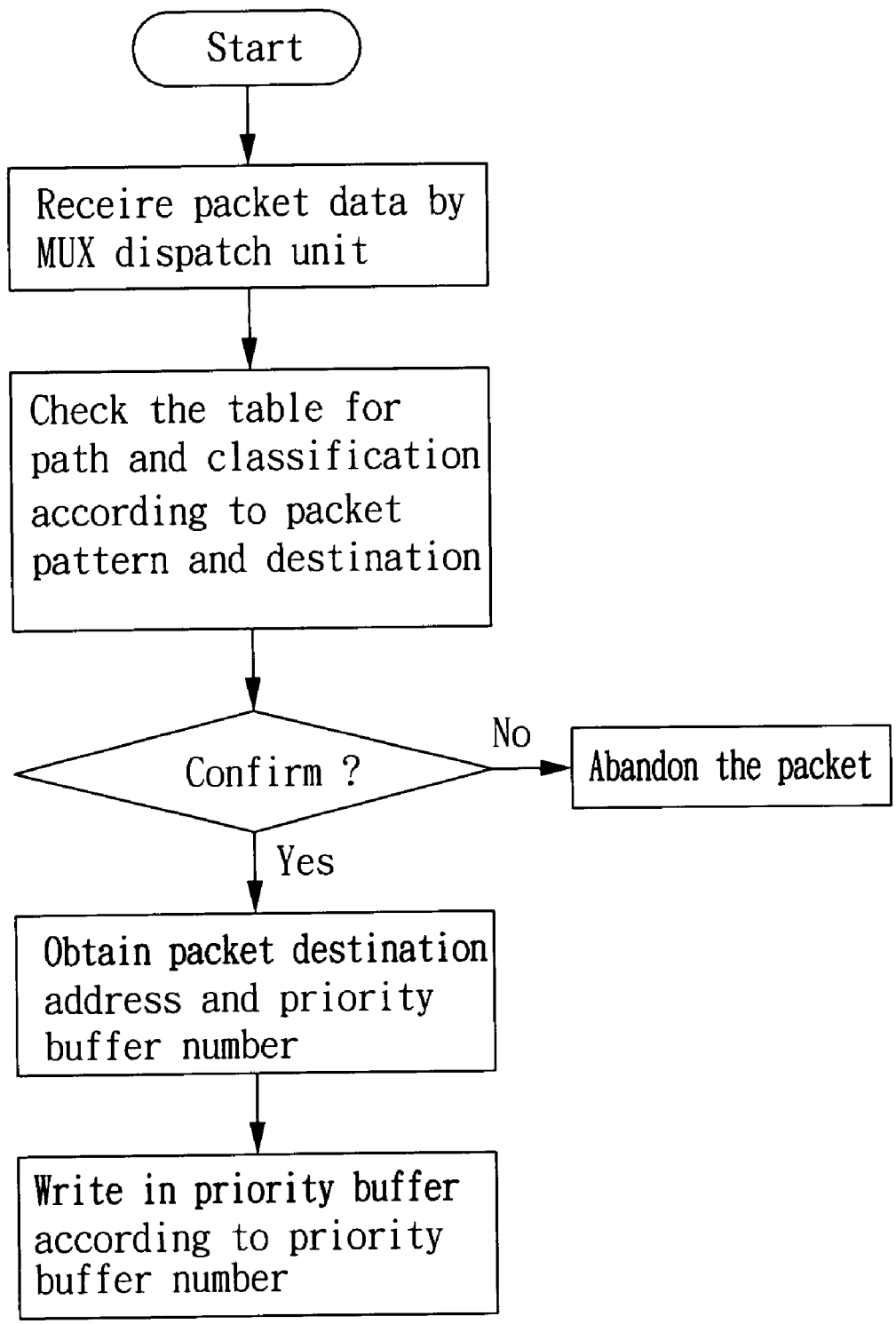
FIG. 8 is a flow chart showing the operation of a dispatch unit according to the present invention.

FIG. 7 is a schematic diagram showing a dispatch unit according to the present invention. The packet classifier 0711 of the dispatch unit 071 is in charge of the process of packet path and classification, and a flow chart showing the operation of a dispatch unit is as shown in FIG. 8. The packet data is received by the multiplex dispatch unit (041 in FIG. 4) and the table for packet path and classification is checked according to the packet pattern and the packet source address so as to determine the destination address and priority sub-buffer number of the packet. The packet is then written in the priority buffer according to the priority sub-buffer number. FIG. 8A is a table showing the packet path and the classification according to the present invention. In FIG. 8A, the packet pattern, packet source address, packet source address and priority sub-buffer number are defined. These values are pre-set before the connection is established. The packet will be abandoned if the packet pattern cannot be identified. The packet pattern includes command packet Cj, event packet Ej, synchronous packet Sk and data packet Dm. Ci indicates the $i^{th}$ command packet, Ej indicates the $j^{th}$ event packet, Sk indicates the $k^{th}$ synchronous packet, and Dm indicates the $m^{th}$ data packet. The packet pattern is determined by the user or the system. The packet source address and the packet destination address are shown by (m+n) bits, wherein the former m bits (x1x2 . . . xm) indicate the selected network and the latter n bits (y1y2 . . . yn) indicate where the source address and the destination address are located. More particularly, n determines the maximum value of the address value of the network. In one embodiment, the dispatch unit can be used for interconnecting CAN, 1394, and Ethernet networks. CAN network uses 11 bits or 29 bits for addressing. 1394 network uses 64 bits for addressing. Ethernet uses 32 bits for addressing. Therefore, 2 bits are used to determine the network and 64 bits are used to indicate where the address is located in the network.

Figure 9:
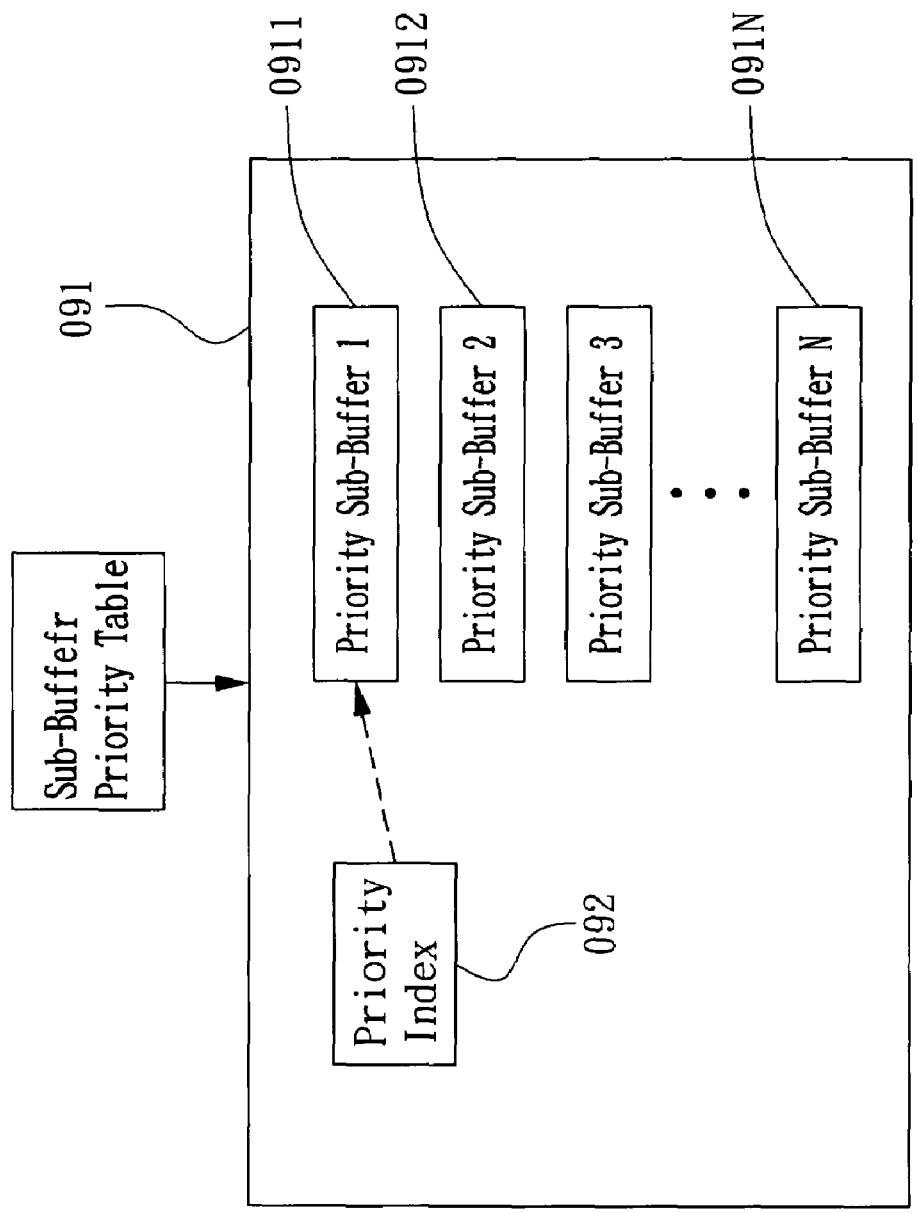
FIG. 9 is a schematic diagram showing a priority buffer according to the present invention.

Please refer to FIG. 9, which is a schematic diagram showing a priority buffer according to the present invention. The priority buffer classifies the packet according to the packet pattern and the destination address so that the multiplex scheduler performs the priority scheduling. As shown in FIG. 9, the priority scheduler is a buffer group 091 with priority, comprising a priority index 092 and at least two priority sub-buffers 0911 to 091N. All the priority sub-buffers can be implemented by using ring buffers (031 in FIG. 3). The priority of the buffer group 091 is shown in FIG. 9A, which is a table showing the sub-buffer priority according to the present invention. The priority index 092 is based on the sub-buffer priority table (FIG. 9A) and points at a priority sub-buffer with the highest priority and stored data. In the beginning, the priority index 092 does not point at any priority sub-buffer so as to indicate there is no stored data in any priority sub-buffer. When data is stored in the buffer group 091, the data is stored in a priority sub-buffer 0911 to 091N corresponding to the priority sub-buffer number. The priority index 092 points at a priority sub-buffer with the highest priority and stored data according to the priority in the sub-buffer priority table. When data is to be read from the buffer group 091, the priority index 092 is obtained so that the priority sub-buffer with the highest priority and stored data is accessed to read the data. When the data in the priority sub-buffer has been read, the priority index 092 is updated and points at a next priority sub-buffer with the highest priority and stored data. Therefore, the multiplex scheduler can process the data with the highest priority. In FIG. 9A, the sub-buffer priority table records the sub-buffer number, the destination network, the packet pattern and the sub-buffer priority. The sub-buffers are labeled from 1 to N, where N is the number of the sub-buffers. The destination network NWi indicates the $i^{th}$ network that is connected. The packet pattern includes command packet Cj, event packet Ej, synchronous packet Sk and data packet Dm. Ci indicates the $i^{th}$ command packet, Ej indicates the $j^{th}$ event packet, Sk indicates the $k^{th}$ synchronous packet, and Dm indicates the $m^{th}$ data packet. The packet pattern is determined by the user or the system. Initially, the value in the sub-buffer priority table is a pre-determined value. While the network is updated, the multiplex scheduler performs arbitration of the sub-buffer priority so as to update the sub-buffer priority value. In one embodiment, a priority buffer uses 6 ring buffers so as to implement the priority of 6 priority levels.

Figure 10:
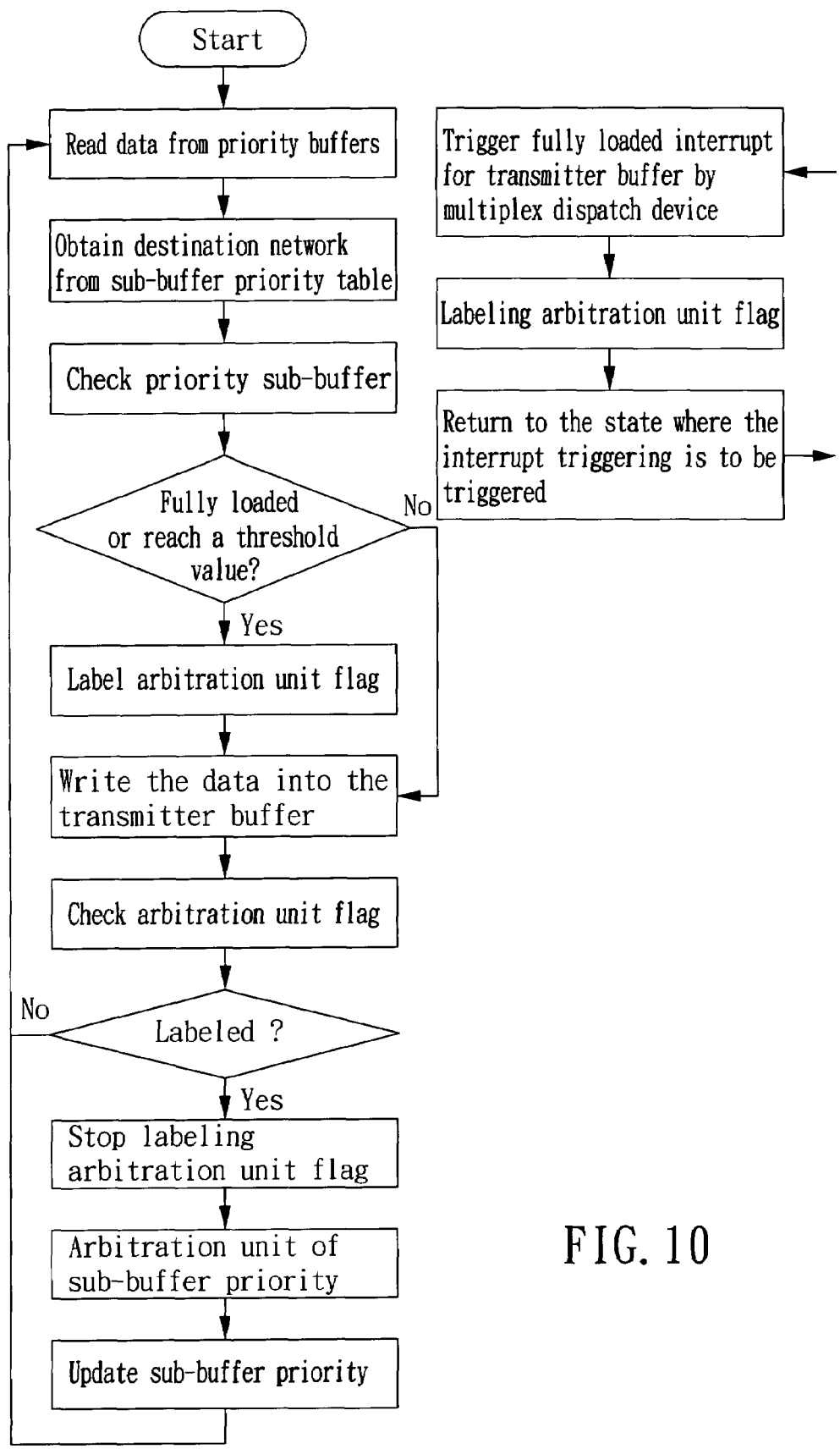
FIG. 10 is a flow chart showing the operation of a multiplex scheduler according to the present invention.

Please refer to FIG. 10, which is a flow chart showing the operation of a multiplex scheduler according to the present invention. After the data in the priority buffers (0911 to 091N in FIG. 9) is read, the destination network is obtained from the sub-buffer priority table in FIG. 9A. Then, the priority sub-buffer is checked. If the priority sub-buffer is fully loaded or the loading degree reaches a determined threshold value, the arbitration unit flag is labeled. Then, the multiplex dispatch unit calls a corresponding multiplexer to pack the data in a suitable format and writes into the transmitter buffer. The arbitration unit flag is checked. If the arbitration unit flag is labeled, the arbitration of the sub-buffer buffer priority is activated so as to update the sub-buffer priority table; otherwise, data is read from the priority buffers. When the multiplex scheduler is performed, the multiplex scheduler may receive an interrupt triggering from the transmitter buffer. The arbitration unit flag is labeled to return to the state where the interrupt triggering is to be triggered. The function of the arbitration of the sub-buffer priority is described hereinafter:

If we assume that the number of connected networks by the packet dispatch device is M, where NW[i] indicates the network i. RB[i] indicates the receiver buffer of the NW[i]. SB[i] indicates the transmitter buffer of the NW[i]. If the number of priority sub-buffers is N, PB[i] indicates the $i^{th}$ priority sub-buffer and P[i] indicates the sub-buffer priority of PB[i]. F(x) indicates the loading degree of the buffer x. G(y) indicates the priority sub-buffer number when the destination network is network y. D[i] indicates the initial value of P[i]. THSB[i] indicates the threshold value of SB[i]. THPB[i] indicates the threshold value of SB[i]. THPB[i] indicates the threshold value of PB[i]. The arbitration process of the sub-buffer priority is described hereinafter:

```
for i=1 to N
do
   P[i] = D[j];
done
for i=1 to M
   if F(SB[i]) > THSB[i]; then
      P[G(NW[i])]++;
   fi
done
for i=1 to N
   if F(PB[i]) > THPB[i]; then
      P[i]++;
   fi
done
```

The above logical expression describes:

Step (a): Initialization: Priority of the priority sub-buffers is determined according to a pre-determined system value. The priority is determined as: event packet>command packet>synchronous packet>data packet;

Step (b): Checking all the priority sub-buffers in the priority buffers: Assuming the loading degree of the priority sub-buffer i is larger than a determined threshold value, the sub-buffer priority of the priority sub-buffer on network j is adjusted to be higher;

Step (c): Checking all the transmitter buffers on the networks: Assuming the loading degree of the transmitter buffer j is larger than a determined threshold value, the sub-buffer priority of the priority sub-buffer on network j as the destination network is adjusted to be higher;

Step (d): Checking the priority sub-buffer for the synchronous packet: Assuming (current time—arrival time of the synchronous packet) is smaller than a determined threshold value, the sub-buffer priority of the priority sub-buffer for the synchronous packet is adjusted to be higher.

Two exemplifying cases of the present invention will be described hereinafter as to explain the applications for interconnection between heterogeneous networks.

Figure 11:
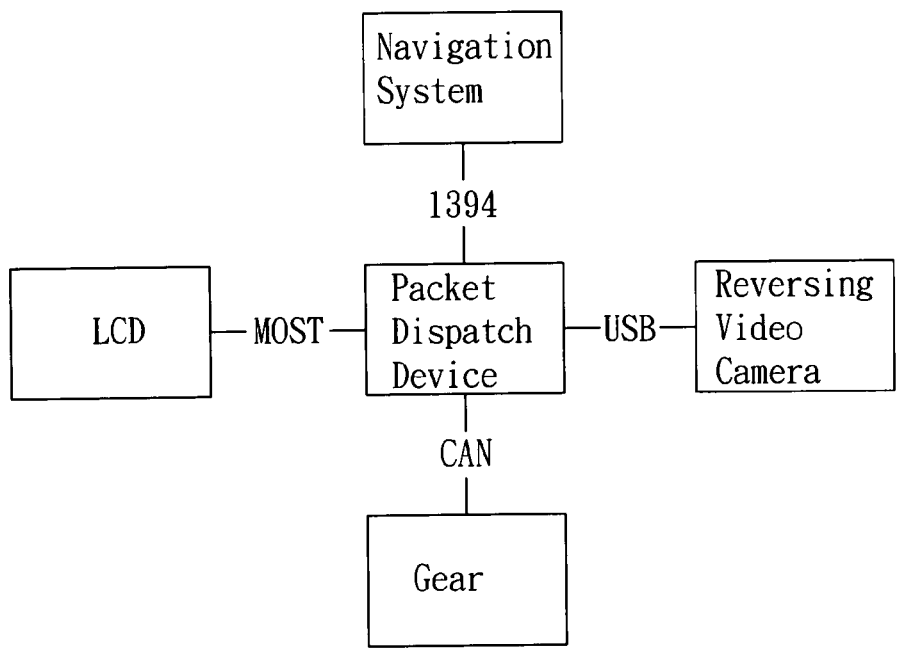
FIG. 11 is a schematic diagram showing an exemplifying case of the present invention.

FIG. 11 is a schematic diagram showing a reversing display system using interconnection between heterogeneous network devices. In FIG. 11, the driver uses a navigation system to assist driving. When the driver is to back his car, he has his car in reverse gear. Meanwhile the navigation information on the display is interrupted and replaced by information from a reversing video camera. In this case, the display is connected to MOST network, the navigation system to 1394 network, the reversing video camera to USB network, and the gear information to CAN network. With the use of packet dispatch device of the present invention, heterogeneous network devices can be integrated so as to form a reversing display system.

Figure 12:
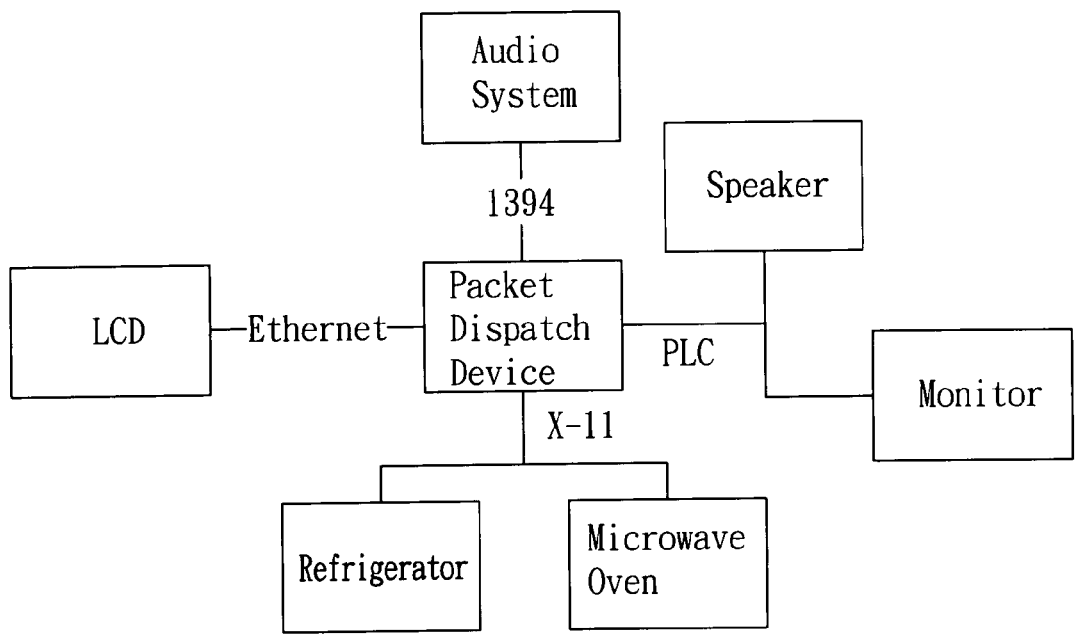
FIG. 12 is a schematic diagram showing another exemplifying case of the present invention.

Please refer to FIG. 12, which is a schematic diagram showing a household network environment using interconnection between heterogeneous network devices. In FIG. 12, an audio system is installed in the living room and connected to the network using 1394 protocol. A speaker using power line communication (PLC) in the bedroom is connected to the audio system through a packet dispatch device so as to play music. A monitor that can be installed in the kids' room or at the main entrance is connected to the network using PLC so that the user in the living room can watch video on the display connected to Ethernet. Moreover, the refrigerator and the microwave oven are connected to the network using X-10 so that the user can check the refrigerator and the microwave oven through the display. In this case, devices with different protocols can be integrated using the packet dispatch device of the present invention. Moreover, interconnection between different networks can be implemented using the packet dispatch device of the present invention. According to the setting of the system as well as the priority pre-determined by the user, dispatch management can be realized with minimum resources.

According to the above discussion, it is apparent that the present invention discloses a method and a device for dispatching packets with different network protocols and supporting IP-based networks, Non-IP-based networks, controller networks and multimedia networks. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A packet dispatch method comprising:
 a packet classification step, for determining a packet destination network and a packet classification according to a packet pattern, a packet source address and a packet destination address; and
 a multi-scheduling step, for determining a priority schedule and traffic arbitration according to the packet pattern, the packet destination network, a loading degree of a transmitter buffer, a loading degree of each of a plurality of priority sub-buffers and arriving time of synchronous packets,
 wherein the packet classification step comprises:
  a1. obtaining packet data using multi-processing;
  b1. looking up in a path and classification table according to the packet pattern and the packet destination address;
  c1. obtaining the packet destination address and a priority buffer number when the corresponding data column is found in the path and classification table, or abandoning the packet when the corresponding data column is not found in the path and classification table;
  d1. writing in priority buffers corresponding to the obtained priority buffer number; and
  e1. returning to step a1 until the packet is dispatched when the packet enters into a packet dispatch device, wherein when the packet is dispatched, the multi-scheduling step is initiated, and
 wherein the multi-scheduling step comprises:
  a2. obtaining data from the priority buffers;
  b2. obtaining packet destination information according to the data and a sub-buffer priority table;
  c2. checking at least one of the priority sub-buffers if the at least one of priority sub-buffers is fully loaded or reaches a determined threshold value then activating an arbitration flag;
  d2. writing the data in the transmitter buffer through a multiplex dispatch unit;
  e2. if the arbitration flag is activated, then checking the arbitration flag and invalidating the arbitration flag and executing a sub-buffer priority arbitration step, and if the arbitration flag is not activated, then returning to step a2;
  f2. updating the sub-buffer priority table; and
  g2. returning to step a2.

2. The packet dispatch method as recited in claim 1, wherein the path and classification table records packet destination network information and packet classification information including the packet pattern, the packet source address, the packet destination address and a priority sub-buffer number.

3. The packet dispatch method as recited in claim 1, wherein the priority sub-buffer stores the packet classified by a packet scheduler, the packet containing the packet pattern, the packet source address and effective loading.

4. The packet dispatch method as recited in claim 1, wherein the sub-buffer priority table records the priority of each of the sub-buffers of the priority buffers, comprising the priority buffer number, the destination network, the packet pattern and the sub-buffer priority.

5. The packet dispatch method as recited in claim 1, wherein the sub-buffer priority arbitration step comprises:
 a3. determining the priority for all the priority sub-buffers according to a pre-determined system value;
 b3. checking all the priority sub-buffers in the priority buffers and adjusting the sub-buffer priority of the priority sub-buffer i to be higher when the loading degree of the priority sub-buffer i is larger than a determined threshold value; and
 c3. checking all the transmitter buffers on the networks and adjusting the sub-buffer priority of the priority sub-buffer on network j as the destination network to be higher when the loading degree of the transmitter buffer j is larger than a determined threshold value.

6. A packet dispatch device for interconnection among at least three networks, a protocol of each of the networks being different from each other, the packet dispatch device comprising:
 at least three ports, each port being connected to a corresponding one of the at least three networks so as to receive a packet from the corresponding one of the at least three networks and transmit the packet to the at least one of the other two of the at least three networks;
 a plurality of multiplex dispatch units, each of the multiplex dispatch units controlling accessing and full-load interruption of a receiver buffer and a transmitter buffer of a corresponding one of the at least three networks;
 a dispatch unit for controlling packet path dispatch and priority schedule,
 a packet classifier, for determining a packet destination network and packet classification according to packet pattern, packet source address and packet destination address; and
 a multi-scheduler, for determining the priority schedule and traffic arbitration according to the packet pattern, the packet destination network, loading degree of a transmitter buffer, loading degree of each priority sub-buffer and arriving time of synchronous packets so as to determine the packet priority and the control traffic arbitration,
 wherein the dispatch unit comprises:
  a path and classification table, for recording packet destination information and packet classification information, including the packet pattern, packet source address, packet destination address and a priority sub-buffer number;
  a priority buffer, for storing the packet classified by the classifier; the packet including the packet pattern, the packet source address and effective loading; and
  a sub-buffer priority table, for recording priority information of the sub-buffers, the priority information including sub-buffer number, the destination network, packet classification and sub-buffer priority.

7. The packet dispatch device as recited in claim 6, wherein the at least three networks can be IP-based networks or Non-IP-based networks.

8. The packet dispatch device as recited in claim 6, wherein the protocol of each of the at least three networks is one of Ethernet, 802.11a/b/g, CAN, LIN, IEEE1394, IDB1394, USB, MOST, Bluetooth, zigbee and X-10.

* * * * *